Patented Dec. 26, 1933

UNITED STATES PATENT OFFICE 1,941,063

DYESTUFF OF THE ANTHRAQUINONE SERIES

Klaus Weinand and Carl Taube, Leverkusen-I. G. Werk, and Hans Hertlein, Leverkusen-Wiesdorf, Germany, assignors to General Aniline Works, Inc., New York, N. Y., a corporation of Delaware No Drawing. Application February 4, 1933, Serial No. 655,252, and in Germany February 8, 1932

7 Claims. (Cl. 260—60)

The present invention relates to a process of preparing dyestuffs of the anthraquinone series and to the new products obtainable by said process.

It is the object of our invention to provide new dyestuffs of the anthraquinone series possessing the property of dyeing wool or other animal fibers clear and strong shades, and which are simultaneously valuable dyestuffs for the dyeing of vegetable fibers (cotton, viscose etc.) from a neutral or weakly alkaline bath.

The dyestuffs in question correspond in their free form to the probable formula:—

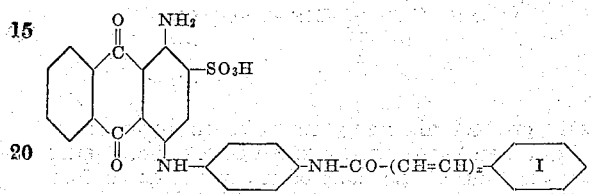

wherein $x$ means one of the numbers 1 or 2 and wherein the nucleus marked I may be substituted by monovalent substituents, more particularly, by alkyl groups (methyl- or ethyl groups, for example) or alkoxy groups (methoxy-, ethoxy-, propylhydroxy groups etc.).

The new dyestuffs may be prepared in various ways. For example, a 1-amino-4-halogenanthraquinone-2-sulfonic acid is caused to react with a compound of the formula:—

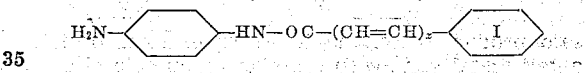

wherein the littera are to be explained as mentioned above. The reaction is performed in the presence of a suitable solvent at a temperature exceeding about 50–60° C. Generally the best results are obtained while applying a temperature of between about 80° C. and the boiling point of the reaction mixture.

Suitable solvents for performing the reaction are water and organic solvents miscible with water such as pyridine, methylalcohol, ethylalcohol etc. Water should advantageously be present in all cases.

Likewise it is desirable to add to the reaction mixture a copper catalyst, such as copper, copper oxide or -hydroxide, cuprous oxide, copper chloride, copper sulfate, cuprous bromide, copper acetate or other copper salts.

Finally, an acid binding agent such as sodium- or potassium carbonate or -bicarbonates etc. should be added.

Another method of preparing our new dyestuffs is by reacting with 1 molecular proportion of para-phenylene-diamine upon 1 molecular proportion of a 1-amino-4-halogenanthraquinone-2-sulfonic acid and acylating the compound thus obtained with a halogenide or another functional derivative of an acid of the probable formula:—

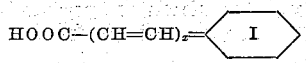

wherein the littera are to be explained as mentioned above. The condensation reaction with para-phenylene diamine as well as the acylating reaction are advantageously performed in an aqueous medium and while heating the reaction mixture. Pyridine, sodium acetate or another acid binding agent may be added in the acylating step of the reaction.

The products thus obtainable generally form dark needles of a bronze-like luster. They dissolve in concentrated sulfuric acid with a violet coloration, in water with a bluish-green to green coloration. The new dyestuffs dye wool from an acid bath bluish-green to green shades. They are also valuable dyestuffs for the dyeing of cotton, viscose or other vegetable fibers according to the methods usually applied for substantive dyestuffs.

The following examples illustrate the invention, without limiting it thereto, the parts being by weight:—

Example 1

10 parts of 1-amino-4-bromoanthraquinone-2-sulfonic acid are heated to boiling for about two hours with 5 parts of the product of the formula:—

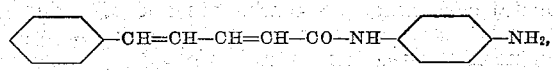

8 parts of sodium carbonate or -bicarbonate, 0.5 part of cuprous chloride and a mixture of 100 parts of water and 50 parts of alcohol. On cooling the dyestuff separates in form of bronze-glittering needles, which dissolve in water with a clear green coloration and dye cotton from a sodium sulfate bath strong green shades of excellent fastness properties, especially to light.

Example 2

7,6 parts of 1-amino-4-bromoanthraquinone-2-sulfonic acid are heated to boiling for about three hours with 6 parts of monocinnamoyl-paraphenylene diamine, 0.5 part of cuprous chloride and 5 parts of sodium carbonate or -bicarbonate in 200 parts of water. On cooling the new dyestuff separates in form of dark green needles, which dissolve in water with a bluish-green coloration and dye viscose according to usual methods bluish-green shades of excellent fastness properties, especially to light.

We claim:—

1. The process which comprises heating a compound having in its free form the probable formula:—

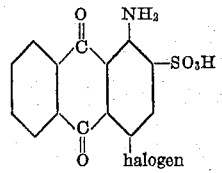

with a compound of the probable formula:—

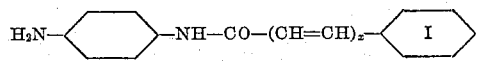

wherein $x$ stands for one of the numbers 1 or 2 and wherein the nucleus marked I may be substituted by alkyl- or alkoxy groups, in the presence of water, a copper catalyst and an acid binding agent at a temperature surmounting about 50–60° C.

2. The process which comprises heating a compound having in its free form the probable formula:—

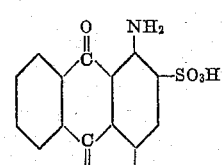

with a compound of the probable formula:—

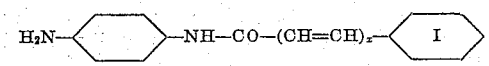

wherein $x$ stands for one of the numbers 1 or 2 and wherein the nucleus marked I may be substituted by alkyl or alkoxy groups, in the presence of water, a copper catalyst and an acid binding agent at a temperature between about 80° C. and the boiling point of the reaction mixture.

3. The process which comprises reacting upon 1-amino-4-bromoanthraquinone-2-sulfonic acid with the compound of the probable formula:—

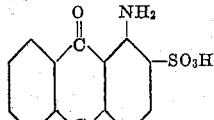

in the presence of a copper catalyst, an alkali metal carbonate or -bicarbonate and of a mixture of ethylalcohol and water at the boiling point of the reaction mixture.

4. The process which comprises reacting upon 1-amino-4-bromoanthraquinone-2-sulfonic acid with monocinnamoyl-para-phenylenediamine in the presence of water, a copper catalyst and of an alkali metal carbonate or -bicarbonate at the boiling point of the reaction mixture.

5. The products having in their free form the probable general formula:—

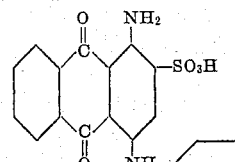

wherein $x$ means one of the numbers 1 or 2 and wherein the nucleus marked I may be substituted by alkyl or alkoxy groups, said products being in form of their alkali metal salts dark needles, dissolving in concentrated sulfuric acid with a violet coloration, in water with a bluish-green to green coloration, dyeing animal and vegetable fibers bluish-green to green shades of good fastness properties.

6. The product having in its free form the probable formula:—

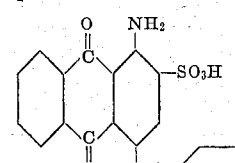

said product dissolving in water in form of its alkali metal salts with a green coloration, dyeing cotton from an aqueous bath containing sodium sulfate green shades of excellent fastness to light.

7. The product having in its free form the probable formula:—

said product dissolving in water in form of its alkali metal salts with a bluish-green coloration, dyeing viscose bluish-green shades of excellent fastness to light.

KLAUS WEINAND.
CARL TAUBE.
HANS HERTLEIN.